Figure 1:
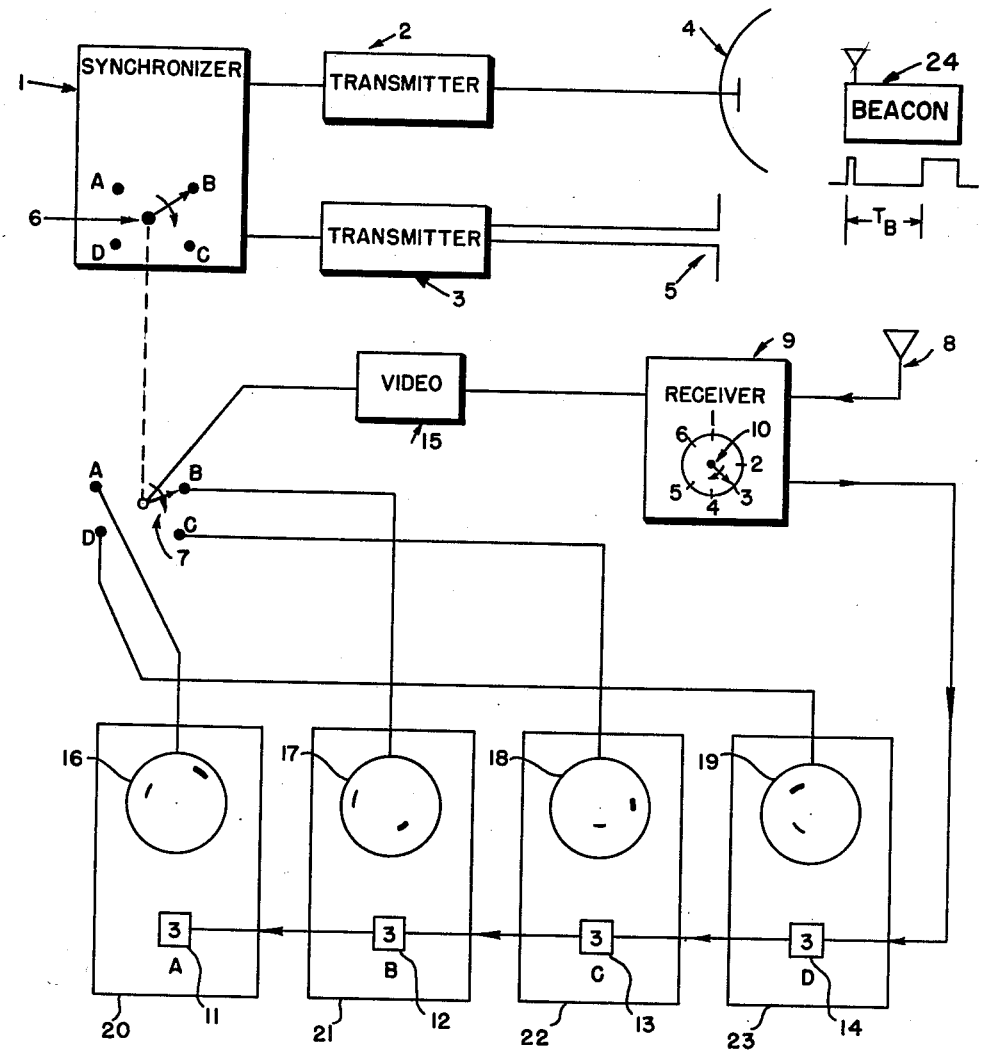

May 4, 1954

M. D. O'DAY 2,677,818

AIRCRAFT IDENTIFICATION SYSTEM

Filed Oct. 19, 1945

2 Sheets-Sheet 1

*INVENTOR.*
MARCUS D. O'DAY

BY

*William D. Hall.*

ATTORNEY

May 4, 1954     M. D. O'DAY     2,677,818
AIRCRAFT IDENTIFICATION SYSTEM
Filed Oct. 19, 1945     2 Sheets-Sheet 2

INVENTOR.
MARCUS D. O'DAY

Patented May 4, 1954

2,677,818

UNITED STATES PATENT OFFICE 2,677,818

AIRCRAFT IDENTIFICATION SYSTEM

Marcus D. O'Day, Arlington, Mass., assignor, by mesne assignments, to the United States of America as represented by the Secretary of War Application October 19, 1945, Serial No. 623,400

5 Claims. (Cl. 343—6.5)

This invention relates to a system for the identification of aircraft and in particular to a system for identifying individual aircraft.

In the control of aircraft, particularly in blind landings, it is very desirable to be able to identify individual aircraft so that landing instructions may be given to a single aircraft with the operator of the device having knowledge as to the location of that aircraft. It is accordingly an object of this invention to devise a system whereby a ground operator may identify each aircraft individually.

In order to be able to identify individual aircraft it is necessary to develop a code which is capable of having the same number of variations as the number of individual aircraft to be identified. It is accordingly a further object of this invention to develop a simple coding means capable of a large number of independent variations.

It is also desirable to have a system for locating individual aircraft in which no aircraft to ground communication is involved. It is a further object of the invention to devise a system whereby individual aircraft may be identified without aircraft to ground communication.

It is a still further object to devise an identification system wherein the individual aircraft need carry only a simple, lightweight beacon which can be preset on the ground.

Other objects and advantages will become readily apparent from the hereinafter described specification.

The basic principle of the system, which may be called "Identification of a Particular Friend" or IPF, is the use of multiple codes. There are several different types of codes which may be used in different combinations. The particular system hereinafter described involves the use of only four factors.

This system utilizes a small, simple beacon carried by the aircraft and a ground interrogator and identifier. The ground interrogator sends out a search pulse from a rotating directional antenna. This search transmitter is operated in the same manner as in any search type radio locator and the receiver associated with it will indicate all aircraft within the range of the set regardless of whether they carry a beacon or not. Associated with the search transmitter is an interrogator transmitter operating at a different frequency from the search band. The frequency of the interrogating band can be adjusted. This provides a code factor which will be called FI. The interrogating band transmitter which usually has a separate antenna, is synchronized with the search band transmitter in such a way that the interrogating band pulse is delayed a predetermined time after the search band pulse. The amount of the delay may be adjusted, which gives another coding factor which will be designated T.

The beacon, carried by the aircraft, is arranged so that it will respond to interrogation only when the time delay between the search band pulse and the interrogating band pulse is the value for which the beacon was set and the interrogating band pulse is of the frequency for which the beacon is set. In addition, the beacon itself provides two additional coding factors in its transmitted pulse. The beacon can be set to transmit pulses of different lengths or shapes (factor L) and can be set to transmit its pulse at different frequencies (factor FB).

If N is the number of possible variations in each code factor, it can be readily seen that the number of possible code combinations is equal to:

$$N_{FI} \times N_T \times N_L \times N_{FB}$$

The number of code factors used will depend on the number of individual aircraft which are to be identified. If a very large number are to be identified, all four code factors would be used. The code factors given above are solely for the purpose of illustration. The invention is not limited to the use of only four code factors. Other code factors could be added if necessary to identify a large number of individual units. Examples of other code factors would be varying the duration or shape of the interrogator pulses or sending out double or triple pulses from the beacons with predetermined time intervals.

Figure 2:
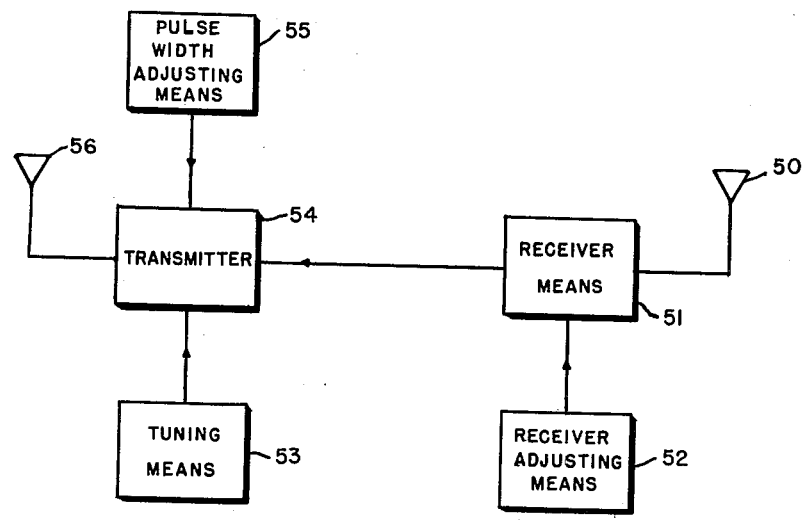

In the accompanying drawings: Fig. 1 illustrates the ground interrogator and identifier; and Fig. 2 illustrates a beacon, such as one carried by an aircraft.

In the embodiment of the invention shown in Fig. 1, provision is made for identifying forty-eight individual aircraft with one interrogator and identifier set. The interrogator is adapted to provide four different time intervals between the search band pulses and the interrogator band pulses. The beacon is adapted to respond with one of six different frequencies and with a pulse of either short or long duration. If it were desired to identify a greater number of aircraft other interrogator-identifier sets could be used having different interrogator band frequencies.

Fig. 1 shows a synchronizer 1 which keys both the search band transmitter 2 and the interrogator transmitter 3. The search band pulse is transmitted from a revolving, directional antenna 4. The interrogator band pulse is transmitted from antenna 5. The synchronizer is so constructed that the interrogator band pulse is transmitted a predetermined time after the search band pulse. The amount of delay depends on the position of the coding switch 6, which provides four different delay intervals. The coding switch is operated so that it changes the interval after each transmitted pulse. The portion of the figure so far described is the interrogator. The remainder of the figure is known as the identifier.

The coding switch 6 of the interrogator is mechanically coupled to the video switch 7 of the identifier. The interrogator band pulses sent out by the airborne beacons for example, by beacon 24, are picked up by the antenna 8 and tunable interrogator receiver 9.

The receiver 9 is tunable to six different interrogator band frequencies. The frequency to which the receiver is set changes for each complete revolution of the antenna 4 and is shown by the indicator 10. This indicator is coupled to other indicators 11, 12, 13 and 14 which are located adjacent the oscilloscope screens. These indicators show the operators the frequency to which the receiver is tuned. An oscilloscope and indicator are located adjacent each other on panels 20, 21, 22 and 23 with a separate operator at each panel position.

The output of the receiver is led to a video amplifier 15 and from there to the video switch 7. This switch connects the video output to the oscilloscopes 16, 17, 18 and 19. These oscilloscopes have the so-called P. P. I. or plan position indicator type of indication. This system is able to identify forty-eight different aircraft and in addition the location of all aircraft within range will be shown.

Fig. 2 illustrates a typical beacon which includes a receiver means 51 for receiving from the interrogator the pulse pairs transmitted therefrom. A receiver adjusting means 52 adjusts the receiver to respond only to pulses having a given time interval therebetween. The receiver is connected to a normally inoperative transmitter 54 which is actuated by the output of said receiver when the latter receives pulse pairs separated by the proper time interval. The carrier frequency of the signal transmitted by the transmitter 54 may be varied (factor FB), by tuning means 53. The width of the pulses transmitted by transmitter 54 may be adjusted (factor L), by pulse width adjusting means 55. Antennas 50 and 56 are receiving and transmitting antennas respectively.

The beacons of all forty-eight aircraft will be tuned to the same search band and interrogator band frequencies. The beacons are divided into four groups of twelve each. All the receivers in a group of twelve are adjusted to respond to the same time interval between the search band and interrogator band pulses and each group of twelve is adjusted to respond to a different time interval, corresponding to one of the four positions of the coding switch 6 in the interrogator. All the beacon responses from the A type of coding will appear in oscilloscope 16 on the A panel. The responses for the B, C and D type of coding will appear on oscilloscopes 17, 18 and 19 respectively. This means that each oscilloscope can identify only twelve aircraft.

In each group of twelve, the beacons are further divided into six groups of two each with each of the sub-group tuned to one out of the six available beacon response frequencies. The tunable receiver of the identifier is tuned to one of the six frequencies for a full revolution of the antenna and is switched to another frequency for the following revolution of the antenna. During any one revolution an oscilloscope will receive the responses from only two aircraft beacons. The operator, by looking at the indicator 11, 12, 13, or 14, can tell which two beacons out of the twelve of his group are showing up on his oscilloscope. In addition to the frequency adjustment, each of the two beacons in the sub-group is adjusted to transmit a different pulse. One beacon will respond with a wide pulse and the other will respond with a narrow pulse. The operator can therefore identify the individual aircraft by noting the length of the beacon pulse.

An operator on oscilloscope 16 would identify an aircraft beacon response by giving the main code group (group A) which this oscilloscope presents, the frequency and the width of the response (wide or narrow). The report on the wide beacon response shown in oscilloscope 16 in the figure could identify the aircraft as A-3-W and could identify the narrow response as A-3-N.

The range indication of the beacon response will not be accurate if the sweep is not delayed, since the response of the beacon is delayed. The beacon response will appear to be at an increased range. The range indication of the oscilloscope can be made correct by delaying the sweep by the proper amount. The amount of delay will be different for each oscilloscope and will depend on the delay between the search band pulse and the interrogator band pulse.

It is desired in this system to show the normal echo pulse from the search band on the oscilloscope screens as well. It is therefore necessary to not delay the sweep during the three pulses out of four when the beacon responses do not appear. It is also necessary to keep the search band echoes from the screen during the one pulse out of four when the beacon responses are shown. The beacon responses being much stronger, will show up on the screen much brighter than the search band returns.

It will be apparent that there may be deviations from the invention as described which still fall fairly within the spirit and scope of the invention, for example the system may be used to identify any mobile unit, such as surface vessels, instead of aircraft.

Accordingly I claim all such deviations which fall fairly within the spirit and scope of the invention, as identified in the hereinafter appended claims.

What is claimed is:

1. Apparatus for identifying individually a plurality of mobile units comprising means for transmitting a first series of pulses of a first predetermined frequency, means for transmitting a second series of pulses of a second predetermined frequency, adjustable delaying means for delaying each pulse of said second series a predetermined time after each pulse of said first series, means adapted to be carried by a mobile unit for transmitting a third series of pulses, means responsive to the time interval between said first and second series of pulses for initiating said third series of pulses, means for varying the frequency of said third series of pulses, means for adjusting the pulse duration of said third series of pulses, a receiver for detecting and amplifying said third series of pulses, means for controlling the frequency to which said receiver means will respond, a plurality of indicating means and means including a rotary switch for connecting said indicating means to the output of said receiver.

2. Apparatus as in claim 1 including means for mechanically coupling said rotary switch to said delaying means whereby each of said indicating means is connected to said receiver only during the time said delaying means is set for a predetermined delay time.

3. A system for identifying each of a plurality of remote stations comprising local station transmitter means for transmitting at least two series of coded interrogator pulse signals, each pulse of one of said series of pulse signals having a given time delay with respect to the corresponding pulse of the other of said series of pulse signals, and said one series of pulse signals having a carrier frequency which differs from the carrier frequency of said other series of pulse signals, means connected to said local transmitter means for periodically changing the code of said pulse signals through a predetermined number of codes, receiver means at each of said remote stations for receiving said interrogator pulse signals, transmitter means at each of said remote stations for respectively transmitting a series of coded responder pulse signals, means at each remote station for actuating the transmitter means thereat in response to a given one of the codes of said interrogator pulse signals, receiver means at the local station for receiving the series of responder signals from each of said remote stations, and signal translating means connected to said local receiver means for identifying each remote station by the code of the series of responder pulse signals received therefrom and the code of the series of interrogator pulse signals to which the remote station is responsive.

4. A system according to claim 3 wherein said means for periodically changing the code of said pulse signals through a predetermined number of codes comprises an adjustable time delay means, means for periodically actuating said time delay means to periodically change the time delay between each pulse signal of said first series of pulse signals and the corresponding pulse signal of said second series of pulse signals through a range of preset time delays and wherein said local receiver means includes means for periodically changing the frequency to which said local receiver is tuned.

5. A system according to claim 4 wherein said signal translating means comprises a plurality of cathode ray tube indicators for displaying said responder signals, and means for selectively energizing said indicators according to the preset time delay between each pulse signal of said first series of pulse signals and the corresponding pulse signal of said second series of pulse signals.

References Cited in the file of this patent

UNITED STATES PATENTS

| Number | Name | Date |
|---|---|---|
| 2,155,821 | Goldsmith | Apr. 25, 1939 |
| 2,252,083 | Luck | Aug. 12, 1941 |
| 2,403,626 | Wolff | July 9, 1946 |
| 2,405,238 | Seeley | Aug. 6, 1946 |
| 2,406,970 | Smith | Sept. 3, 1946 |
| 2,407,287 | Labin | Sept. 10, 1946 |
| 2,408,048 | Deloraine | Sept. 24, 1946 |
| 2,411,520 | Capen | Nov. 26, 1946 |
| 2,444,426 | Busignies | July 6, 1948 |
| 2,448,016 | Busignies | Aug. 31, 1948 |
| 2,459,811 | Grieg | Jan. 25, 1949 |
| 2,515,178 | Barchok | July 18, 1950 |
| 2,531,412 | Deloraine | Nov. 28, 1950 |